United States Patent [19]

Montague et al.

[11] Patent Number: 4,836,933
[45] Date of Patent: Jun. 6, 1989

[54] WATER TREATMENT POLYMER

[75] Inventors: Peter G. Montague, Warwicks; Peter Bainbridge, Northants, both of United Kingdom

[73] Assignee: National Starch and Chemical Corporation, Bridgewater, N.J.

[21] Appl. No.: 4,395

[22] Filed: Jan. 16, 1987

[51] Int. Cl.$^4$ .............................................. C02F 5/10
[52] U.S. Cl. ..................................... 210/701; 526/287
[58] Field of Search ................................ 210/698, 701

[56] References Cited

U.S. PATENT DOCUMENTS

| | | | |
|---|---|---|---|
| 3,663,448 | 5/1972 | Hotchkiss | 252/180 |
| 3,839,393 | 10/1974 | Steckler | 558/32 |
| 3,928,196 | 12/1975 | Persinski et al. | 210/58 |
| 3,959,167 | 5/1976 | Hwa et al. | 252/180 |
| 4,029,577 | 6/1977 | Godlewski et al. | 210/58 |
| 4,202,568 | 12/1981 | May et al. | 252/389.2 |
| 4,209,398 | 6/1980 | Ii et al. | 210/58 |
| 4,255,259 | 3/1981 | Hwa et al. | 210/699 |
| 4,306,991 | 12/1981 | Hwa | 252/180 |
| 4,324,664 | 4/1982 | Snyder et al. | 210/701 |
| 4,326,980 | 4/1982 | Snyder et al. | 252/180 |
| 4,374,733 | 2/1983 | Snyder et al. | 210/701 |
| 4,530,766 | 7/1985 | Hamn et al. | 210/701 |
| 4,552,665 | 11/1985 | Ralston | 210/697 |
| 4,676,911 | 6/1987 | Fong | 210/701 |

FOREIGN PATENT DOCUMENTS

| | | |
|---|---|---|
| 0133210 | 6/1984 | European Pat. Off. |
| 0122013 | 10/1984 | European Pat. Off. |
| 0017373 | 3/1986 | European Pat. Off. |
| 83/02607 | 8/1983 | PCT Int'l Appl. |
| 1534596 | 9/1975 | United Kingdom . |
| 2061249 | 10/1980 | United Kingdom . |

OTHER PUBLICATIONS

"Inhibition of the Corrosion of Industrial Cooling Systems", J. Weber, Br. Corros. J., 1979, vol. 14, No. 2.
"Cooling-Water Treatment for Control of Scaling, Fouling, Corrosion", S. Strauss & P. Puckorius, Reprinted from Power, Jun. 1984.

Primary Examiner—Christopher Henderson
Attorney, Agent, or Firm—Ellen T. Dec; Edwin M. Szala

[57] ABSTRACT

Aqueous media are treated to reduce or prevent the deposition of solid material therein comprising the addition to the water of an effective amount of at least one polymer or copolymer formed from a monomer of the following general structure:

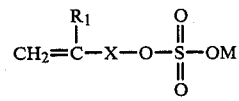

wherein $R_1$ is independently H or $CH_3$; X is $(CH_2)_n$ with n an integer of 0 or 1 or

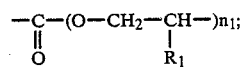

$n_1$ is an integer of 1 to 10; and M is a metal cation, ammonium or hydrogen.

17 Claims, No Drawings

WATER TREATMENT POLYMER

BACKGROUND OF THE INVENTION

The present invention relates to a method for controlling the formation and deposition of scale forming salts in aqueous media. The polymers disclosed herein also find use as part of a corrosion control system to maintain solubilization of the corrosion inhibitors such as zinc and phosphate compounds.

Deposits in cooling waters are classified in two categories—foulants and scales. Foulants usually result from suspended solids in the system and are high in organics. Scales on the other hand are hard, adherent mineral deposits that precipitate from solution. Foulants can usually be removed by pre-treatment of the cooling water, such as by filtration. It is the prevention of deposition of scale with which the present invention is primarily concerned.

The problems associated with mineral scaling in cooling water systems have been known for many years. In such systems water flowing around heat exchange equipment deposits mineral scale on the surface of the installation. This scale builds up in layers giving an insulation effect, reducing the heat transfer of the apparatus and also resulting in poor water circulation. Eventually this necessitates the shut-down of the unit to allow mechanical or chemical cleaning.

Depositions in lines, heat exchange equipment, etc., may originate from several causes. For example, the precipitation of calcium carbonate and calcium phosphate will form scale, but products of corrosion also result in a deposit of iron oxide salts. These are deposited as scales due to changes in temperature, pH, concentration, pressure and incompatible water additives.

The development of high pH and/or non-chromate corrosion programs has increased the potential for scale formation due to chemical precipitation. In particular, since most of the treatments currently used include phosphate and/or phosphonic acid compounds, the reversion of the polyphosphates and the organic phosphates plus the use of high alkaline operating conditions leads to the formation and deposition of highly insoluble calcium phosphate.

Although steam generating systems are different from cooling water systems, they share common problems relating to calcium phosphate and iron oxide formation and other mineral scale deposition. In this regard, the formation of scale and sludge deposits on boiler heating surfaces is the most serious water problem encountered in steam generation. Although current industrial steam producing systems make use of external treatments of the boiler feed water to reduce scale forming ions, those operations are not totally effective and do not provide adequate treatment since muds, sludge, silts and hardness-imparting ions are not treated thereby, and eventually are introduced into the steam generating system.

Accordingly, internal treatment, i.e., the use of solubilizing chemicals which have the ability to keep the scale-forming materials in solution at concentrations substantially higher than would be expected are used throughout the industry in an attempt to alleviate the problems encountered by such scale deposition. Such solubilizing chemicals include alginates, lignins, lignosulfonates, tannins, carboxymethyl cellulose materials, and synthetic polymers such as polyacrylates and polymethacrylates. Since most of the solubilizing chemicals used are effective for only one or two of the scale forming salts, it is necessary to use a mixture of chemicals in order to provide adequate scale prevention in these aqueous systems. Thus, depending upon the chemicals present, it may be necessary to employ polymer dispersants to control calcium sulfate and calcium phosphate with organo-phosphorous chemicals used to disperse calcium carbonate. Further, the presence of iron oxide or other materials may additionally reduce the action of the scale prevention chemicals being utilized.

Although the foregoing is directed for the most part to cooling water systems and steam generating systems, the same problems occur in scrubber systems and the like. Any aqueous system having calcium and magnesium cations and the exemplified anions, in particular phosphate, will experience the formation and deposition of the scaling salts.

A further need for water treatment polymers such as are disclosed herein arises in the case of corrosion control systems where there has been an increasing emphasis to the use of high pH and/or non-chromate agents such as those utilizing phosphate and/or zinc. These latter materials have limited solubility and it has been found necessary to add other chemicals to the systems in order to maintain the solubility thereof.

SUMMARY OF THE INVENTION

Accordingly, the present invention provides a method for treating aqueous systems to reduce or prevent the deposition of solid material therein comprising the addition to the water of an effective amount of at least one polymer or copolymer formed from a monomer of the following general structure:

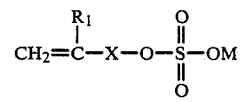

where $R_1$ is independently H or $CH_3$; X is $(CH_2)_n$ with n an integer of 0 or 1 or

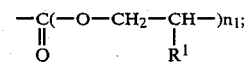

$n_1$ is an integer of 1 to 10; and M is a metal cation, ammonium or hydrogen. Comonomers useful with these polymerizable monomers include monocarboxylic acids or dicarboxylic acids and anhydrides thereof such as acrylic acid, methacrylic acid, maleic acid, itaconic acid or water soluble salts thereof, as well as acrylamide and its derivatives. The addition of a third comonomer such as an ester of a ethylenically polymerizable mono- or dicarboxylic acid, for example methyl acrylate, ethyl acrylate, methyl methacrylate, etc.; a maleate or fumarate ester or diester; a hydroxyalkylacrylate, for example hydroxyethyl acrylate, hydroxyethylmethacrylate, etc.; allyl alcohol; vinyl esters such as vinyl acetate or vinyl propionate; vinyl alcohol obtained by hydrolyzing a vinyl ester based polymer; vinyl ethers; styrene; etc.; has also been found beneficial.

In a preferred embodiment, the addition of polymers or copolymers of a 2-sulfato alkyl acrylate or methacrylate monomer or water soluble salts thereof, more preferably of a 2-sulfato ethyl acrylate or methacrylate, has been found most beneficial.

The above described polymers or copolymers have been found to have wide spread use as a scale anti-deposition and dispersion agents being effective in systems containing divalent salts of carbonates, phosphates and sulfates, etc., such as calcium carbonate and zinc phosphate, particularly in those systems containing iron oxide. It is well known that industrial problems associated with scale formation can be compounded by the presence of soluble iron and suspended matter. The ability of the polymers described herein to tolerate these interferences gives them a distinct advantge over other conventionally employed inhibitors.

DETAILED DESCRIPTION OF THE PREFERRED EMBODIMENTS

The polymers used herein are those consisting essentially of 2 to 100 molar percent of a monomer of the following general structure:

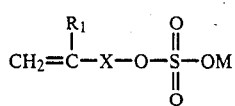

where $R_1$ is independently H or $CH_3$; X is $(CH_2)_n$ with n an integer of 0 or 1 or

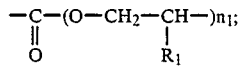

$n_1$ is an integer of 1 to 10; and M is a metal cation, ammonium or hydrogen; 0 to 98% of a comonomer of acrylic acid, methacrylic acid, maleic acid or water soluble salts thereof or acrylamide and its derivatives; and 0 to 50% of a third monomer. Generally the molecular weights (Mw-weight average molecular weight as determined by gel permeation chromatography) of the copolymer will vary from 1000 to 100,000, preferably 1000 to 20,000 and most preferably from 1000 to 7500. Repesentative monomers useful herein include, for example, 2-sulfato ethyl acrylate, 2-sulfato ethyl methacrylate, 2-sulfato propyl acrylate, 2-sulfato propyl methacrylate, and water soluble salts thereof as well as of allyl sulfate and methallyl sulfate, and the water soluble salts thereof, etc.

The preferred class of 2-sulfato alkyl acrylate or methacrylate comonomers utilized herein are characterized by the following formula:

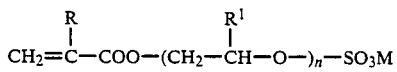

wherein R is either hydrogen or methyl, $R^1$ is either hydrogen or alkyl of from 1 to 22 carbon atoms, n is at least one positive integer of from 1 to 3 when $R^1$ is either hydrogen or alkyl of from 1 to 2 carbon atoms, and n is one when $R^1$ is an alkyl of from 3 to 22 carbon atoms. M is either hydrogen, ammonium or an alkali metal, e.g. sodium, potassium or lithium, or an alkaline salt metal, e.g., calcium. They are readily prepared by the reaction of a hydroxy alkyl acrylate or methacrylate with sulfamic acid in the presence of an organic amide catalyst using the procedure taught, for example, in U.S. Pat. No. 3,839,393 issued Oct. 1, 1974 to Robert Steckler. Particularly preferred for use in water treating, especially for aqueous systems containing very high phosphate levels, are the copolymers containing at least 5%, preferably 10 to 50% by weight, of the 2-sulfato alkyl(meth)acrylate comonomer.

The polymers utilized in accordance with the invention can be prepared by vinyl addition polymerization or by sulfation of a hydroxy functional acrylic acid or salt polymer. More specifically, acrylic acid or derivatives thereof or their water soluble salts, e.g., sodium, potassium, ammonium, etc. can be copolymerized with the 2-sulfato alkyl(meth)acrylate or other suitable monomer for use herein under standard copolymerization procedures utilizing free radical initiators such as benzoyl peroxide, azobisisobutyronitrile or redox initiators such as ferrous sulfate and ammonium persulfate. The molecular weights of the resulting copolymer can be controlled utilizing standard chain control agents such as secondary alcohols (isopropanol), mercaptans, halocarbons etc.

The resulting polymers or copolymers are added to the aqueous systems in an effective amount, i.e., an amount which will control the formation and deposition of scale and/or disperse the solid particulate materials. These appropriate amounts are dependent upn the respective concentrations in the water of the potential scale and deposit formers, the pH of the water and the chemical and physical properties of the polymer. The criteria for proper treatment of any aqueous system would be apparent to those skilled in the art of water treatment. Generally amounts of 1–50 parts per million have been found most cost effective with the effective amount depending in large part, on the nature of the aqueous system being treated and the degree of build-up already in the system.

The polymers disclosed herein are generally used in conjunction with one or more other water treating chemicals such as an inorganic phosphoric acid, phosphoric acid salt, organic phosphate or phosphonate acid ester or polyvalent metal salt. Generally, the phosphate or phosphonate compounds are utilized in a range of about 1 to 100 ppm (as $PO_4$) and the polyvalent metal salts in an amount of 1 to 50 ppm (as metal ion). The latter compounds may be added separately to the water being treated or may be combined with an aqueous solution of the polymers of the invention and added continuously or intermittently to the water system. The polymers may also be used in conjunction with conventional corrosion inhibitors such as chromates, bichromates, tungstate, molybdates, nitrites, borates, silicates, oxycarboxylic acids, amino acids, catechols, aliphatic amino surface active agents, benzo triazole mercaptobenzothiazole, etc; conventional scale and contamination inhibitors such as lignin derivatives, tannic acid, starch, polyacrylic acids, polyacrylic amide, etc; metal sequestering agents such as polyamines and polyamino carboxylic acids; as well as other conventional water treating agents.

While the preferred embodiments of invention have been described, for example, in terms of copolymerization of a 2-sulfato alkyl acrylate with other comonomers, it will also be understood that similar results would be obtained by use of a copolymer prepared by sulphating a copolymer containing hydroxy alkyl groups with the appropriate comonomers.

In the following examples, which are for illustrative purposes only, all parts are by weight and all temperatures in degrees Celsius unless otherwise noted. The test procedures utilized in evaluating the polymers of the invention are presented below.

TEST PROCEDURES

Calcium Phosphate Inhibition Procedure

In order to establish that the present invention provided overall effectiveness, two different evaluations were conducted which simulated water conditions found in cooling water systems where the concentration of calcium ions and phosphate ions are such as to provide a calcium phosphate scale-prone system. Commercial grade polymers were also concurrently screened for comparative purposes.

The evaluations were conducted utilizing solutions respectively containing calcium ion and ortho-phosphate ion. After mixing the two solutions and holding for the specified equilibration time, residual phosphate ion measurements were made after the mixture had been filtered. High residual phosphate ion concentration indicated good inhibition.

The specifics of the test procedure are as follows:

| Conditions | Solutions |
|---|---|
| $Ca^{+2}$ = 250 ppm as $CaCO_3$ | (1) 36.76 g $CaCl_2 \cdot 2H_2O$/liter deionized water |
| $PO_4^{-3}$ = 6 ppm | (2) 0.4482 g $Na_2HPO_4$/liter deionized water |
| T = 70° C. | |
| pH = 8.5 | |
| 17 Hour equilibration | |

Procedure
1. Add 20 ml. of solution (1) to 1800 ml. deionized water in a 2 liter volumetric flask followed by 2 drops of concentrated hydrochloric acid.
2. Add 40 ml. of solution (2) and bring volume to 2 liters with distilled water.
3. Place 100 ml. aliquots of solution in clean 4 oz. glass bottles.
4. Add desired treatment.
5. Adjust pH to 8.5 with sodium hydroxide and place in 70° C. water bath.
6. Allow samples to equilibrate for 17 hours.
7. Remove samples from water bath and filter immediately through 0.22 micron filters; Allow samples to cool.
8. Preparation for analysis:
   a. 5 mls. filtrate
   b. Dilute to 10 ml. in 25 ml. volumetric flask.
   c. Add 5 ml. colormetric reagent made previously by dissolving 10 g. of ascorbic acid into 100 ml. of equal volumes of 2.5% ammonium molybdate and 1% bismuth subcarbonate.
   d. Dilute to volume and allow to stand 5 minutes for color development.
9. Take absorbance measurements using Bausch and Lomb Spectronic 20 photometer (660 nm).
10. Using current calibration curve (Absorbance vs. ppm $PO_4^{-3}$) find ppm $PO_4^{-3}$ of each sample.

Calculation:

$$\% \text{ Inhibition} = \frac{\text{ppm } PO_4^{-3} \text{ (treated)} - \text{ppm } PO_4^{-3} \text{ (blank)}}{\text{ppm } PO_4^{-3} \text{ (stock)} - \text{ppm } PO_4^{-3} \text{ (blank)}}$$

In a second series of tests, the procedure described above was repeated but the aqueous systems were modified so as to additionally contain 2 parts per million ferric ion.

Calcium sulfate and calcium carbonate inhibition were tested using NACE (National Association of Corrosion Engineers) Standard TM-03-74 developed by Tack Group T-1D-9 of Unit Committee T-1 on Control of Oil Field Corrosion by Chemical Treatment.

EXAMPLE

A 50:50 weight percent composition of acrylic acid: 2-sulfato ethyl methacrylate, was prepared using the following procedure:

Deionised water (200 gms) and isopropanol (200 gms) were charged to the reaction vessel and heated to reflux. A monomer solution of acrylic acid (200 gms) and the ammonium salt of hydroxy ethyl methacrylate sulphate (800 gms of 25.0% actives solution) and a catalyst solution of sodium persulphate (16.0 gms) in deionized water (100 gms) were added over three hours to the refluxing medium.

The reaction was held at reflux for one hour longer. An isopropanol/water azeotrope (440 gms) was removed under vacuum. The solution was cooled and sodium hydroxide (115 gms) in deionized water (125 gms) were added with cooling to yield 1317 gms of 35.0% w/w polymer solution.

The product was characterized using Gel Permeation Chromatography and gave a molecular weight parameter of Mw=5000; Mn=2200 with respect to sodium polyacrylate standards. (Mw is the weight average molecular weight and Mn is the number average molecular weight).

Using a similar procedure, varying the amounts of the monomeric components, other copolymers as described below were prepared. In the tables, the following abbreviations are used:
  AA = acrylic acid
  HPA = hydroxypropyl acrylate
  Allyl OH = allyl alcohol
  SSMA = sulfonated polystyrene maleic anhydride
  HEMA = hydroxy ethyl methacrylate
  HEMAS = 2-sulfato ethyl methacrylate ammonium salt

| Polymer Composition (parts by weight) | Mw[1] | Mn[2] |
|---|---|---|
| 71 AA: 19 Allyl OH: 10 HEMAS | 5900 | 2500 |
| 56 AA: 34 HPA: 10 HEMAS | 3500 | 1500 |
| 56 AA: 34 HPA: 10 HEMA | 4700 | 2200 |
| 60 AA: 40 HEMAS | 4650 | 1900 |
| 50 AA: 50 HEMAS | 5000 | 2200 |
| 50 AA: 50 HEMA | 6800 | 2200 |
| 25 AA: 75 HEMAS | 5600 | 2260 |
| 62.5 AA: 37.5 HPA | 3700 | 1500 |
| Polyacrylic acid | 3500 | 1800 |
| Polyphosphino carboxylic acid | 3400 | 1300 |

[1] Wt. average Molecular Weight
[2] Number average Molecular Weight

The polymers described above were evaluated using the procedure described previously. Additionally, evaluations were carried out on several commercially available water treatment polymers as well as on polymers prepared utilizing the unsulfonated hydroxy ethyl methacrylate. All polymers were tested at a calculated dose in the sodium salt form.

The results of the testing are shown in Tables I–IV below.

TABLE I

% INHIBITION OF CALCIUM PHOSPHATE (No Iron)

| Polymer/Dosage | 2.5 ppm | 5 ppm | 10 ppm |
|---|---|---|---|
| 71 AA: 19 Allyl OH: 10 HEMAS | 14 | 73 | 96 |
| 56 AA: 34 HPA: 10 HEMAS | 17 | 96 | 97 |
| 56 AA: 34 HPA: 10 HEMA | — | — | 85 |
| 50 AA: 50 HEMAS | 20 | 50 | 100 |
| 50 AA: 50 HEMA | — | — | 85 |
| 62.5 AA: 37.5 HPA | — | 77 | 91 |
| 65:35 SSMA | — | 56 | 94 |
| Polyacrylic acid | — | — | 0 |
| Polyphosphino carboxylic acid | — | — | 82 |

TABLE II

% INHIBITION OF CALCIUM PHOSPHATE (2 ppm $Fe^{+3}$)

| Product/Dosage | 5 ppm | 10 ppm |
|---|---|---|
| AA: 19 Allyl OH: 10 HEMAS | 44 | 78 |
| 56 AA: 34 HPA: 10 HEMAS | 45 | 95 |
| 56 AA: 34 HPA: 10 HEMA | — | 80 |
| 50 AA: 50 HEMAS | — | 90 |
| 50 AA: 50 HEMA | — | 82 |
| 62.5 AA: 37.5 HPA | — | 87 |
| 85:15 SSMA | — | 45 |
| 65:35 SSMA | 36 | 87 |
| Polyphosphino carboxylic acid | — | 58 |

TABLE III

% INHIBITION OF CALCIUM CARBONATE

| Polymer/Dosage | 5 ppm | 10 ppm |
|---|---|---|
| 71 AA: 19 Allyl OH: 10 HEMAS | 36 | 39 |
| 56 AA: 34 HPA: 10 HEMAS | 38 | 42 |
| 62.5 AA: 37.5 HPA | 31 | 46 |
| 85:15 SSMA | 0 | 0 |
| 65:35 SSMA | 0 | 31 |
| Polyacrylic acid | 66 | 95 |

TABLE IV

% INHIBITION OF CALCIUM SULFATE

| Polymer/Dosage | 0.5 ppm | 2.5 ppm | 5 ppm |
|---|---|---|---|
| 71 AA: 19 Allyl OH: 10 HEMAS | 51 | 88 | — |
| 56 AA: 34 HPA: 10 HEMAS | 49 | 84 | — |
| 62.5 AA: 37.5 HPA | — | 98 | 100 |
| 85:15 SSMA | 13 | 67 | 96 |
| 65:35 SSMA | — | 96 | 100 |
| Polyacrylic acid | 96 | 100 | — |

The results of Tables I and II show that the copolymers of the invention are very effective as calcium phosphate inhibitors at treatment reates as low as 5 ppm. Additionally, at a 10 ppm treatment rate with 2 ppm iron present, the AA:HPA/HEMAS copolymer inhibited 95% of the phosphate. In the calcium carbonate and calcium sulfate testing, the copolymers of the invention did not function as efficiently as the low molecular weight polyacrylic acid but their performance was better than many of the other commercially employed copolymers.

EXAMPLE 2

The test procedure described above was repeated using a variety of ratios and components in the copolymer. In this series of tests, antimony potassium tartarate solution was used in the single reaction reagent and a wavelength setting of 880 nm was employed. Results are shown in Table V.

TABLE V

CALCIUM PHOSPHATE INHIBITION BY HEMA SULFATE COPOLYMERS

| | Percentage Inhibition | | |
|---|---|---|---|
| Polymers/Dosage | 5 ppm | 7 ppm | 10 ppm |
| 71 AA: 19 Allyl OH: 10 HEAMS | 10 | 95 | 100 |
| 56 AA: 34 HPA: 10 HEMAS | 50 | 100 | 100 |
| 60 AA: 40 HEMAS | 35 | 95 | 95 |
| 50 AA: 50 HEMAS | 75 | 80 | 90 |
| 25 AA: 75 HEMAS | 75 | 85 | 85 |
| 62.5 AA: 37.5 HPA | 80 | 100 | 100 |
| Polyacrylic acid | 0 | 0 | 0 |

EXAMPLE 3

The following tests were performed in order to evaluate the behavior of the water treatment polymers in aqueous media containing higher levels of phosphate since recent observations have indicated that higher levels of phosphate and calcium are now encountered in the field.

The procedures described previously were repeated using 10 ppm phosphate and 300 ppm calcium ions at a pH of 8.5, 70° C. for 16 hours with and without 2 ppm iron with a dosage level of 15 ppm as sodium salt. The results are shown in Table VI.

TABLE VI

| | Percentage Inhibition | |
|---|---|---|
| Polymer | No Iron | With Iron |
| 56 AA: 34 HPA: 10 HEMAS | 90 | 75 |
| 56 AA: 34 HPA: 10 HEMA | 55 | 35 |
| 50 AA: 50 HEMAS | 100 | 75 |
| 50 AA: 50 HEMA | 65 | 35 |
| 65:35 SSMA | 80 | 40 |
| Polyphosphino carboxylic acid | 10 | — |

The results show that the polymers of the present invention containing at least 10% by weight HEMAS show significant improvement in performance over those of the prior art in these higher phosphate systems.

EXAMPLE 4

This test was performed in order to show the performance of the water treatment polymers in aqueous systems which may be exposed to high temperatures. In this example, the evaluations were performed as in Example 2 but using a temperature of 90° C. and a doseage of 20 ppm as sodium salt. The results are shown in Table VII.

TABLE VII

| | Percentage Inhibition | | |
|---|---|---|---|
| Polymer | No Iron | With 2 ppm $Fe^{3+}$ | With 3 ppm $Fe^{3+}$ |
| 56 AA: 34 HPA: 10 HEMAS | 0 | 0 | 0 |
| 56 AA: 34 HPA: 10 HEMA | 0 | 0 | 0 |
| 50 AA: 50 HEMAS | 80 | 75 | 65 |
| 50 AA: 50 HEMA | 65 | 58 | 55 |
| 62.5 AA: 37.5 HPA | 0 | 0 | — |

In conclusion, the results of the examples presented herein show that the performance of the copolymers of the invention as a primary phosphate inhibitor and as a primary calcium phosphate inhibitor as compared to other commercially available product were excellent. In addition, their performance in the presence of iron in the phosphte test and moderate tolerance to other calcium salts contribute to their uniqueness for treatment of scale control in aqueous systems. As such, they are applicable to any aqueous system where calcium phosphate formation and precipitation is a potential problem.

When tested for their ability to disperse suspended matter such as china clay, the polymers of the invention, particularly the 2-sulfato alkyl(meth)acrylates, were found to possess adequate dispersant activity but were not as efficient as sodium polyacrylate homopolymers.

Similar results would be obtained utilizing other copolymers discussed herein including, for example, copolymers of 2-sulfato ethyl methacrylate, 2-sulfato propyl acrylate, 2-sulfate propyl methacrylate, allyl sulfate, methallyl sulfate, etc.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A method for treating aqueous systems to reduce or prevent the deposition of solid material therein comprising the addition thereto of an effective amount of a polymer or copolymer consisting essentially of 2 to 100 mole percent of a monomer of the following general structure:

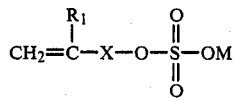

where $R_1$ is independently H or $CH_3$; X is $(CH_2)_n$ with n an integer of 0 to 1 or

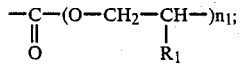

$n_1$ is an integer of 1 to 10; and M is a metal cation, ammonium or hydrogen; 0 to 98% of a comonomer selected from the group consisting of acrylic acid, methacrylic acid, maleic acid and water soluble salt, thereof, acrylamide and its derivatives thereof; and 0 to 50% of a third copolymerizable comonomer.

2. The method of claim 1 wherein the polymer or copolymer has a molecular weight of 1000 to 100,000.

3. The method of claim 2 wherein the polymer or copolymer has a molecular weight of 1000 to 20,000.

4. The method of claim 2 wherein the polymer or copolymer has a molecular weight of 1000 to 7500.

5. The method of claim 1 wherein the third comonomer is selected from the group consisting of esters of ethylenically polymerizable carboxylic acids, maleate and fumarate esters and diesters, hydroxyalkyl acrylates, allyl alcohol, vinyl esters, vinyl alcohol obtained by hydrolyzing a vinyl ester based polymer, vinyl ethers and styrene.

6. The method of claim 1 wherein the aqueous system is a steam generating system.

7. The method of claim 1 wherein the aqueous system is a cooling water system.

8. The method of claim 1 wherein the aqueous system is a gas scrubbing system.

9. A method for treating aqueous systems to reduce or prevent the deposition of solid material therein comprising the addition thereto of an effective amount of a polymer or copolymer consisting essentially of 2 to 100 mole percent of a 2-sulfato alkyl acrylate acrylate or methacrylate or water soluble salt therof; 0 to 98% of a comonomer selected from the group consisting of acrylic acid, methacrylic acid, maleic acid and water soluble salt, thereof, acrylamide and its derivatives thereof; and 0 to 50% of a third copolymerizable comonomer.

10. The method of claim 9 wherein the polymer or copolymer has a molecular weight of 1000 to 100,000.

11. The method of claim 9 wherein the third monomer is selected from the group consisting of esters of ethylenically polymerizable carboxylic acids, maleate and fumarate esters and diesters, hydroxyalkyl acrylates, allyl alcohol, vinyl esters, vinyl alcohol obtained by hydrolyzing a vinyl ester based polymer, vinyl ethers and styrene.

12. The method of claim 9 wherein the 2-sulfato alkyl methacrylate is 2-sulfato ethyl methacrylate or a water soluble salt thereof.

13. The method of claim 9 wherein the polymer contains at least 5 molar percent of the 2-sulfato(meth)acrylate comonomer.

14. The method of claim 9 wherein the copolymer contains at least 40 molar percent of the 2-sulfato(meth)acrylate comonomer.

15. The method of claim 9 wherein the copolymer consists essentially of acrylic acid, allyl alcohol and 2-sulfato ethyl methacrylate ammonium salt.

16. The method of claim 9 wherein the copolymer consists essentially ofacrylic acid, hydroxypropyl acrylate and 2-sulfato ethyl methacrylate.

17. The methodof claim 9 wherein the copolymer consists essentially of acrylic acid and 2-sulfato ethyl methacrylate ammonium salt.

* * * * *